United States Patent
Duquette et al.

(10) Patent No.: US 7,621,567 B2
(45) Date of Patent: Nov. 24, 2009

(54) CORRUGATED TUBE FITTING WITH A RIDGE SEALING DEVICE AND METHOD

(75) Inventors: Scott Duquette, Enfield, CT (US); Franz Kellar, Gastonia, NC (US)

(73) Assignee: Titeflex Corporation, Springfield, MA (US)

( * ) Notice: Subject to any disclaimer, the term of this patent is extended or adjusted under 35 U.S.C. 154(b) by 6 days.

(21) Appl. No.: 11/440,740

(22) Filed: May 24, 2006

(65) Prior Publication Data

US 2007/0273149 A1    Nov. 29, 2007

(51) Int. Cl.
   *F16L 25/00*    (2006.01)
(52) U.S. Cl. ............... 285/334.5; 285/331; 285/903
(58) Field of Classification Search ............. 285/331, 285/247, 248, 249, 334.5, 903
   See application file for complete search history.

(56) References Cited

U.S. PATENT DOCUMENTS

| | | | | |
|---|---|---|---|---|
| 2,189,566 | A * | 2/1940 | Kreidel | 285/332.4 |
| 2,333,909 | A * | 11/1943 | Williams | 285/332.4 |
| 2,363,586 | A * | 11/1944 | Guarnaschelli | 285/222.5 |
| 2,444,622 | A * | 7/1948 | Wolfram | 285/332.4 |
| 4,437,691 | A * | 3/1984 | Laney | 285/353 |
| 4,630,850 | A * | 12/1986 | Saka | 285/322 |
| 4,674,775 | A * | 6/1987 | Tajima et al. | 285/330 |
| 4,801,158 | A * | 1/1989 | Gomi | 285/52 |
| 4,907,830 | A * | 3/1990 | Sasa et al. | 285/91 |
| 5,799,989 | A * | 9/1998 | Albino | 285/334.5 |
| 6,019,399 | A * | 2/2000 | Sweeney | 285/248 |
| 6,036,237 | A * | 3/2000 | Sweeney | 285/322 |
| 6,099,046 | A * | 8/2000 | Oh | 285/354 |
| 6,173,995 | B1 | 1/2001 | Mau | |
| 6,276,728 | B1 * | 8/2001 | Treichel | 285/382.7 |
| 6,357,801 | B1 * | 3/2002 | Takahashi et al. | 285/334.5 |
| 6,428,052 | B1 | 8/2002 | Albino et al. | |
| 6,435,570 | B1 * | 8/2002 | Kato et al. | 285/334.5 |
| 6,877,781 | B2 | 4/2005 | Edler | |
| 6,896,299 | B1 * | 5/2005 | Nishio | 285/331 |
| 6,908,114 | B2 | 6/2005 | Moner | |
| 7,055,868 | B2 * | 6/2006 | Watanabe | 285/249 |
| 7,080,860 | B2 * | 7/2006 | Takagi et al. | 285/256 |
| 7,238,317 | B2 * | 7/2007 | Hegler | 264/508 |
| 2004/0155463 | A1 * | 8/2004 | Moner | 285/322 |
| 2005/0023832 | A1 * | 2/2005 | Edler | 285/354 |
| 2005/0285401 | A1 * | 12/2005 | Treichel et al. | 285/903 |
| 2006/0006651 | A1 | 1/2006 | Watanabe | |

* cited by examiner

*Primary Examiner*—James M Hewitt
(74) *Attorney, Agent, or Firm*—Jeffrey D. Hsi; Steven M. Jensen; Edwards Angell Palmer & Dodge LLP

(57) ABSTRACT

A sealing device and method for sealing a length of tubing with a fitting is provided, where the sealing device includes at least one sealing surface formed with a plurality of ridges. The ridges include at least one end ridge and at least one internal ridge which are spaced apart by a predetermined distance, and formed with a desired geometry such as U-shaped, V-shaped, or various other shapes and with different sealing faces such as curved or flat. The ridges are spaced apart in a manner to maximize sealing pressure, and produce stress concentrations and localized deformations, in order to create a seal at lower torques or on stiffer tubing or tubing with at least one minor defect such as a dent or weld. The sealing device is particularly useful for sealing an end corrugation of tubing in a fitting used in gas and liquid piping systems.

18 Claims, 5 Drawing Sheets

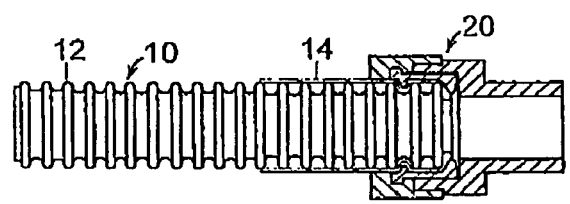
FIG. 1
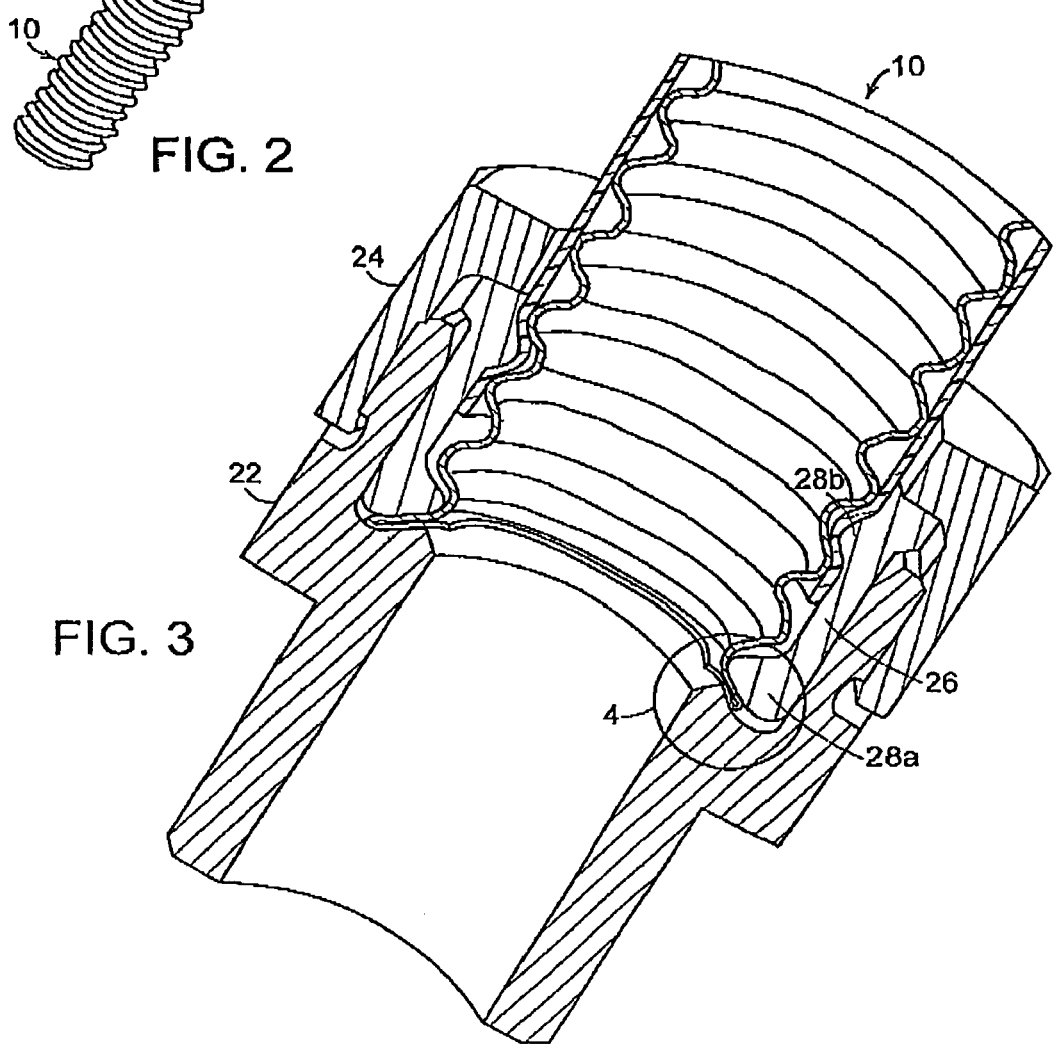
FIG. 2
FIG. 3

CORRUGATED TUBE FITTING WITH A RIDGE SEALING DEVICE AND METHOD

FIELD OF INVENTION

The present invention relates to gas and liquid piping systems, and more particularly to a device and method for forming a seal between a length of corrugated tubing and a fitting, the fitting incorporating a sealing device with a ridge geometry.

BACKGROUND OF THE INVENTION

Gas and liquid piping systems which utilize corrugated stainless steel tubing ("CSST") and fittings are known. Such piping systems can be designed for use in combination with elevated gas pressures of up to about 0.03 megapascals (MPa) or more, and provide advantages over traditional rigid black iron piping systems in terms of ease and speed of installation, elimination of onsite measuring, and reduction in the need for certain fittings such as elbows, tees, and couplings. Undesirably, some fittings conventionally used with CSST systems include fiber sealing gaskets which can deteriorate over time, or pre-flared tubing ends, which suffer from reliability problems.

A suitable self-aligning and self-flaring fitting assembly, which does not require the use of a sealing gasket, is disclosed in U.S. Pat. No. 6,173,995 to Mau ("the '995 patent"), which is incorporated by reference herein. The '995 patent is owned by Titeflex Corporation, assignee of the present application, and discloses a self-flaring fitting assembly for use with semi-flexible, convoluted tubes or pipes, including CSST systems. The fitting assembly includes an externally-threaded adapter having a pipe receiving bore divided into a plurality of sections of different diameters, a nut threaded to a first end of the adapter, and a split bushing assembly with at least two internally spaced ribs for engaging circumferential grooves of the corrugated tubing, as shown in FIGS. 2-5 of the '995 patent. The fitting assembly disclosed in the '995 patent forms a seal by compressing an end corrugation or convolution between an internal stop shoulder of the adapter and one end of the split bushing assembly. As shown in FIGS. 3 and 4 of the '995 patent, the sealing surfaces used to form the metal-to-metal seal are substantially flat. A seal formed according to the above mechanism may be suitable for preventing leaking of gas and/or liquid through the pipe and fitting connection. However, in some instances, excessive torque may be required to create a seal on larger, stiffer tubing that may have some minor defects such as dents or weld imperfections.

It would be desirable to provide an improved sealing arrangement to ensure an adequate seal between tubing and a fitting. Such a sealing arrangement preferably could be used in conjunction with other fitting arrangements and other piping and tubing systems, particularly those designed for transporting gas and/or liquid.

In some fittings designed for use with CSST systems, an end corrugation of the tubing is compressed to form a metal-to-metal seal. Examples of such sealing arrangements include U.S. Pat. No. 6,428,052 to Albino et al., U.S. Pat. No. 6,877,781 to Edler, and U.S. Pat. No. 6,908,114 to Moner. However, according to the fittings disclosed in these patents, sealing is accomplished by compressing the end corrugation against generally flat sealing surfaces.

It would be desirable to provide an improved fitting configured for connection to a length of corrugated tubing, where the fitting incorporates a sealing device with an improved sealing geometry. The fitting and related sealing devices and methods should overcome the deficiencies of the presently available fittings and sealing arrangements, which form a seal using generally flat surfaces.

SUMMARY OF THE INVENTION

A fitting incorporating a sealing device having a ridge geometry is provided for connecting the fitting to a length of tubing, such as corrugated stainless steel tubing (CSST), commonly used in gas and liquid piping systems. The present invention also encompasses a method for sealing the fitting to a length of tubing using a plurality of sealing ridges. The sealing device and method of the present invention further can be used to connect two fittings.

According to the present invention, sealing ridges are formed on at least one surface of the fitting, where the ridge surface may replace a generally flat surface in conventional fittings. The sealing ridges preferably include annular ridges with variations in shapes, spacing, and sealing face geometry, and can be manufactured of different materials.

In various embodiments as described herein, the fitting incorporating the sealing device of the present invention can form a metal-to-metal seal with a length of tubing, where the seal preferably is formed by collapsing or compressing at least one corrugation of the length of tubing. For example, the end corrugation of the tubing can be sealed to the fitting, thereby forming a metal-to-metal seal.

The metal-to-metal seal preferably is formed without the use of gaskets or elastomers sometimes used in conventional fittings, where the presence of gaskets or elastomers, which may be prone to deterioration, can negatively impact long-term durability by making the seal less robust and unpredictable due to polymer chain degradation and polymer material leeching (hardening and cross-sectional shrinkage). Moreover, use of a ridge geometry in the metal-to-metal seal according to the present invention can provide significant advantages over conventional sealing techniques, which utilize generally flat or smooth sealing surfaces. For example, the sealing ridges tend to form a more robust seal by presenting a feature, i.e., the ridge, which creates concentrated annular stress and/or deformation ring(s) with at least some overall tolerance for misalignment or component manufacturing variances, thereby avoiding durability and reliability problems that plague conventional fittings.

According to the present invention, the ridges used to form the metal-to-metal seal are spaced apart in a manner to maximize sealing pressure, and produce stress concentrations and/or localized deformations, in order to create at least one of: a seal at lower torques, a seal on stiffer tubing, or a seal on tubing that may have at least one minor defect such as a dent or weld. The sealing device is particularly useful for sealing an end corrugation of tubing in a fitting used in gas and liquid piping systems.

A seal can be formed by collapsing an end corrugation between first and second sealing surfaces of a fitting. At least one of the sealing surfaces preferably is formed with a plurality of ridges, including at least one end ridge and one or more internal ridges. The size, shape, geometry, and spacing between the ridges is determined to maximize sealing pressure, and can result in localized stress concentrations. Suitable ridge shapes include U-shaped, V-shaped, and various other configurations such as flat shapes, arcs, and curves. The ridges can be made of various materials such as stainless steel, brass, and plastics.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein:

FIG. 1 is a cross-sectional side view of a length of corrugated tubing received in a fitting, which incorporates a sealing device according to the present invention;

FIG. 2 is a cross-sectional view through the tubing and fitting depicted in FIG. 1.

FIG. 3 is an enlarged cross-sectional view of the tubing and fitting of FIG. 2;

DEFINITIONS

Figure 4:
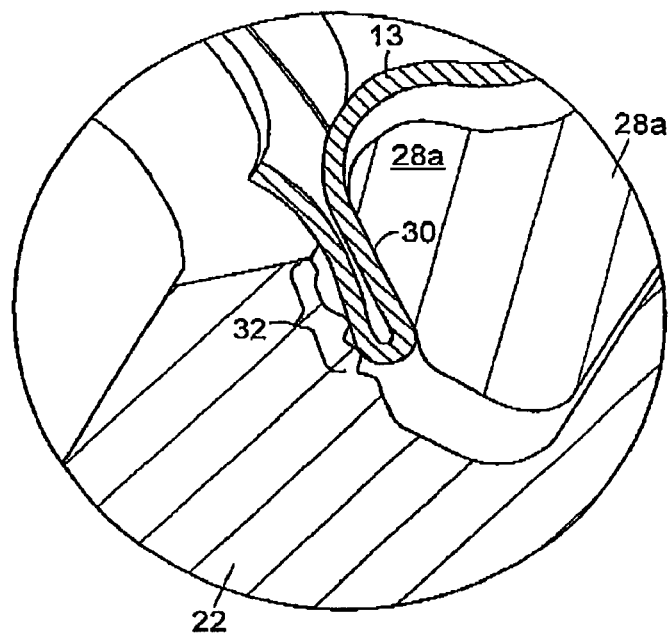
FIG. 4 is a further enlarged cross-sectional view based on FIG. 3, showing the sealing ridges in greater detail.
Figure 5:
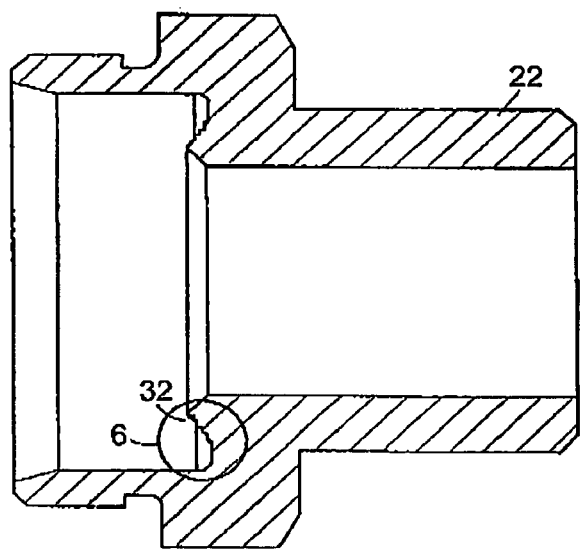
FIG. 5 is an isolated cross-sectional side view of the fitting incorporating a sealing device according to the present invention.

The instant invention is most clearly understood with reference to the following definitions:

As used in the specification and claims, the singular form "a", "an" and "the" include plural references unless the context clearly dictates otherwise.

As used herein, the terms "corrugated stainless steel tubing" and "CSST" refer to any type of semi-flexible tubing or piping, which may accommodate corrosive or aggressive gases or liquids, and includes but is not limited to semi-flexible tubing or piping made from: thermoplastics, metal or metal alloy materials such as olefin-based plastics (e.g., polyethylene (PE)), fluorocarbon polymers (e.g., polytetrafluoroethylene (PTFE)), carbon steel, copper, brass, aluminum, titanium, nickel, and alloys thereof.

DETAILED DESCRIPTION OF THE INVENTION

A fitting according to the present invention incorporates a sealing device having a ridge geometry, preferably a plurality of sealing ridges provided on at least one sealing surface. The fitting can be connected to a length of tubing, such as corrugated stainless steel tubing (CSST), commonly used in gas and liquid piping systems. Alternatively, the fitting can be connected to another fitting using the ridge geometry.

In various embodiments as described herein, the fitting incorporating the sealing device of the present invention forms a metal-to-metal seal with a length of tubing, where the seal preferably is formed by collapsing or compressing at least one corrugation of the length of tubing. For example, the end corrugation of the tubing can be sealed to the fitting, thereby forming a metal-to-metal seal. Use of a ridge geometry in the metal-to-metal seal according to the present invention can improve reliability and durability as compared to conventional sealing techniques, which utilize generally flat or smooth sealing surfaces. Moreover, a sealing device having the ridge geometry can reduce the contact area in a seal, which can produce higher sealing pressures using the same applied force.

Referring to FIGS. 1-4, a first exemplary embodiment of a sealing device according to the present invention is shown, whereby the sealing device is incorporated into a fitting connected to a length of tubing, such as corrugated stainless steel tubing (CSST), for example, as used in gas and liquid piping systems.

As shown in FIG. 1, a fitting 20 can be connected to a length of tubing 10, where the tubing 10 optionally is jacketed, that is, covered by a smooth jacket 14 made of polyethylene or like material. Alternatively, the tubing 10 can be provided without a jacket. At least a portion of the jacket 14 may be removed prior to forming the seal connecting the tubing 10 with the fitting 20. As shown in FIG. 1, the tubing 10 includes a plurality of convolutions or corrugations 12.

Referring to FIGS. 2 and 3, the fitting 20 is connected to the tubing 10, and a seal is formed by collapsing an end corrugation of the tubing 10. The basic components of the fitting 20 are substantially the same as those described in U.S. Pat. No. 6,173,995 to Mau, which is incorporated by reference herein. For example, the fitting 20 preferably includes an adapter 22 having a bore for receiving the tubing 10, where the adapter 22 can include sections having different diameters. The fitting 20 also includes a nut 24 having a bore and a stop shoulder. Further, a split bushing 26 is received in the adapter 22, where the split bushing 26 can have a bore with a pair of semicircular bushing halves, and at least two spaced apart internal ribs 28a and 28b for engaging circumferential grooves in the tubing 10. At least the adapter 22 and the split bushing 26 are formed with sealing surfaces, and can be referred to as first and second components, respectively, of the fitting. Details of the interconnection of the various components to form a seal by collapsing an end corrugation of the tubing 10 is provided in U.S. Pat. No. 6,173,995. Therefore, the manner in which a seal is formed will not be further described herein.

As shown in FIG. 4, when sealing is effected using the above-described components, in the manner provided in U.S. Pat. No. 6,173,995, a stop shoulder 32 of the adapter 22 defines a first sealing surface, which preferably includes a plurality of sealing ridges, to be discussed in further detail below. A first end 30 of the internal rib 28a serves as a second sealing surface, where the second sealing surface can be generally flat. Although the sealing of an end corrugation is described with reference to a stop shoulder and a first end of an internal rib, other types of sealing surfaces can be used, including components that are different from those described or shown in FIGS. 1-4. The present invention encompasses any sealing mechanism, for example, for connecting tubing with a fitting, or for connecting two fittings, which utilize sealing ridges on at least one of the sealing surfaces.

Referring to FIG. 4, sealing ridges preferably are provided on either the first end 30 of the internal rib 28a or the stop shoulder 32, or can be provided on both the first end 30 and the stop shoulder 32, for example, in an accordion arrangement. For illustration purposes, the sealing ridges as described herein are provided on the stop shoulder 32. Through a mechanism described in greater detail in the '995 patent, an end corrugation 13 of the tubing 10 is compressed or collapsed between the first and second sealing surfaces to form a seal.

Figure 6:
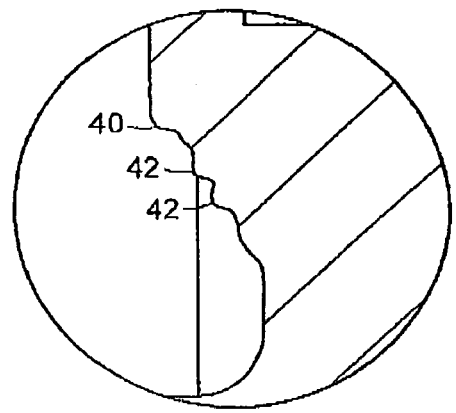
FIG. 6 is an enlarged cross-sectional side view showing the sealing device of FIG. 5 in greater detail.

Referring to FIGS. 5-8, the adapter 22 of the fitting is shown in isolation, in order to illustrate details of the first sealing surface. The first sealing surface defined by the stop shoulder 32 of the adapter preferably includes at least one end ridge 40 spaced apart from a plurality of internal ridges 42. The at least one end ridge 40 can include one or more ridges formed near or adjacent to an end of the stop shoulder 32, as shown in FIG. 6. To form an optimal seal, the internal ridges 42 are spaced apart by a predetermined distance from the end ridge 40, where the optimal spacing can be determined based on localized stresses in the sealing interface. In general, it is desirable to use a plurality of ridges instead of a flat sealing face in order to minimize contact area with the end corrugation, thereby increasing local contact force and resulting sealing pressure and producing areas of concentrated stresses.

Figure 10:
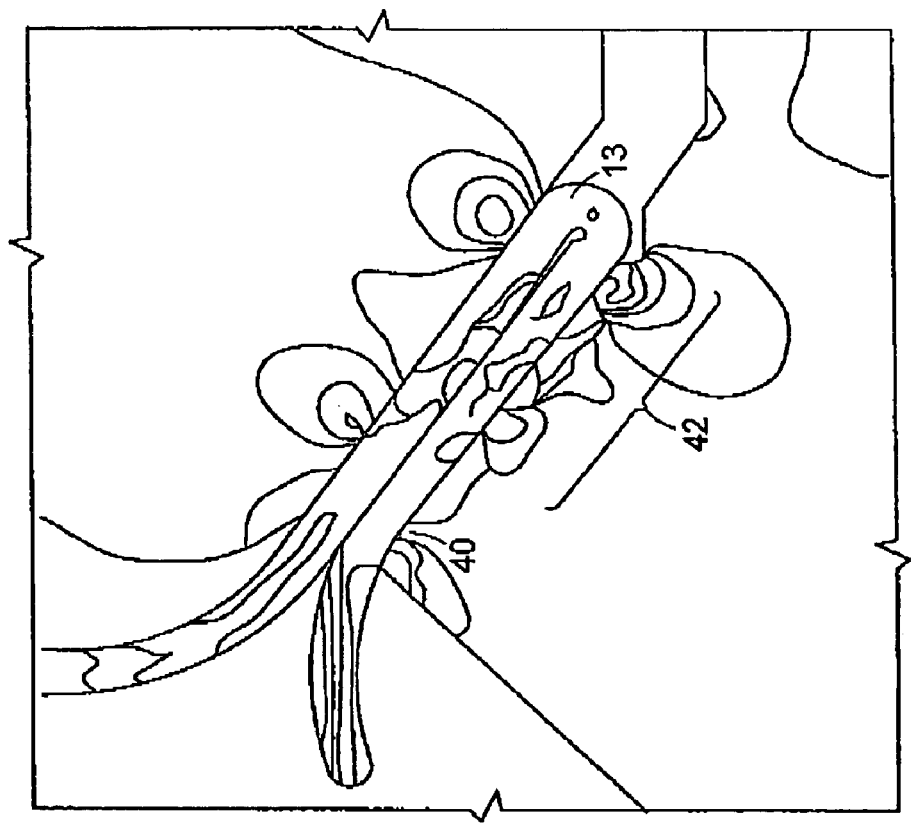
FIG. 10 is a schematic view depicting sealing according to a second exemplary embodiment of the present invention.
Figure 9:
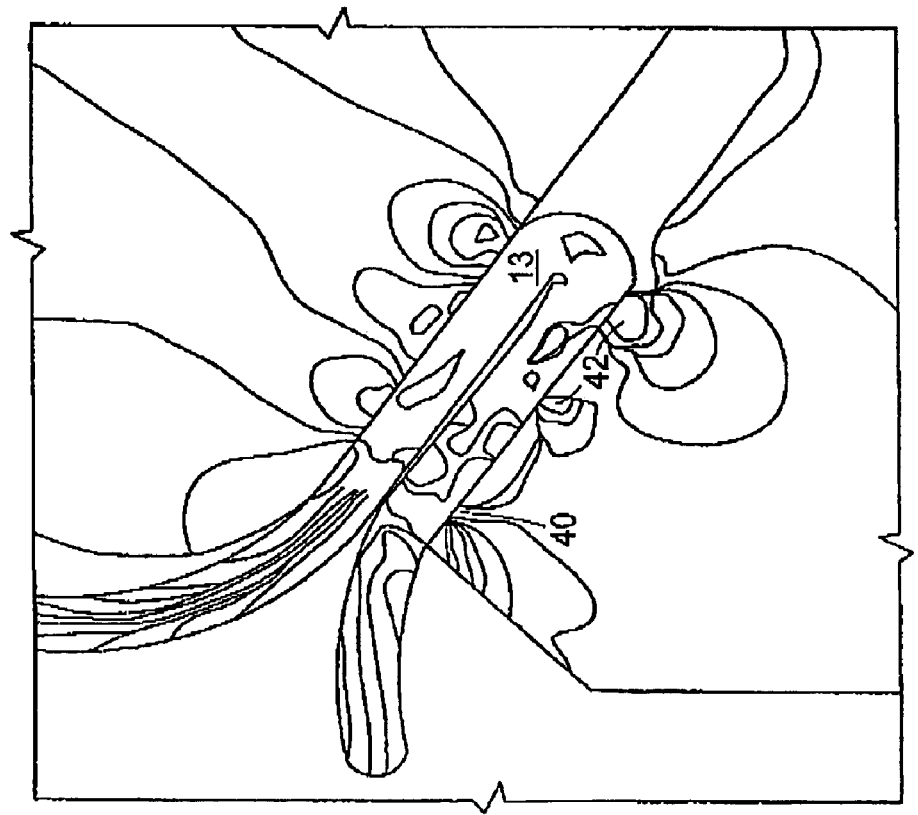
FIG. 9 is a schematic view depicting sealing according to a first exemplary embodiment of the present invention.

For example, FIGS. 9 and 10 schematically depict stress concentrations produced by different sealing devices, including a first exemplary embodiment with two internal ridges 42 (see FIG. 9), and a second exemplary embodiment with three internal ridges 42. The use of one or more internal ridges 42 is determined based on the desired sealing pressure and anticipated stress load concentrations. Generally, a greater number of internal ridges should be used for sealing tubing with larger circumferences, for example, larger sizes of corrugated tubing. Likewise, a lesser number of internal ridges should be used for sealing circumferentially smaller sizes of tubing.

Figure 7:
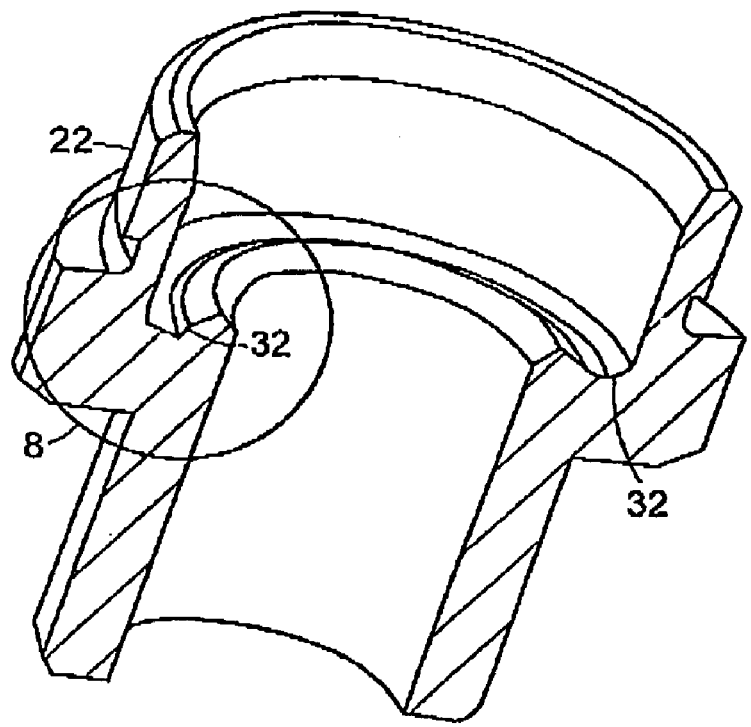
FIG. 7 is a perspective view of a fitting incorporating a sealing device according to the present invention.
Figure 8:
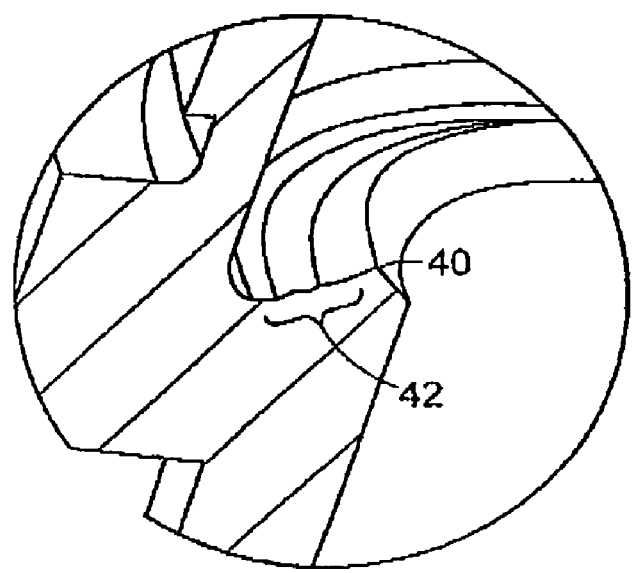
FIG. 8 is an enlarged perspective view of the sealing device shown in FIG. 7.

The stop shoulder 32 used as the ridge sealing surface according to the present invention is depicted in FIGS. 7 and 8. Preferably the stop shoulder 32 extends circumferentially around the adapter 22, and the ridges 40 and 42 provided in the stop shoulder 32 can extend up to 360° around the stop shoulder 32, preferably around the entire circumference of the stop shoulder.

Figure 11:
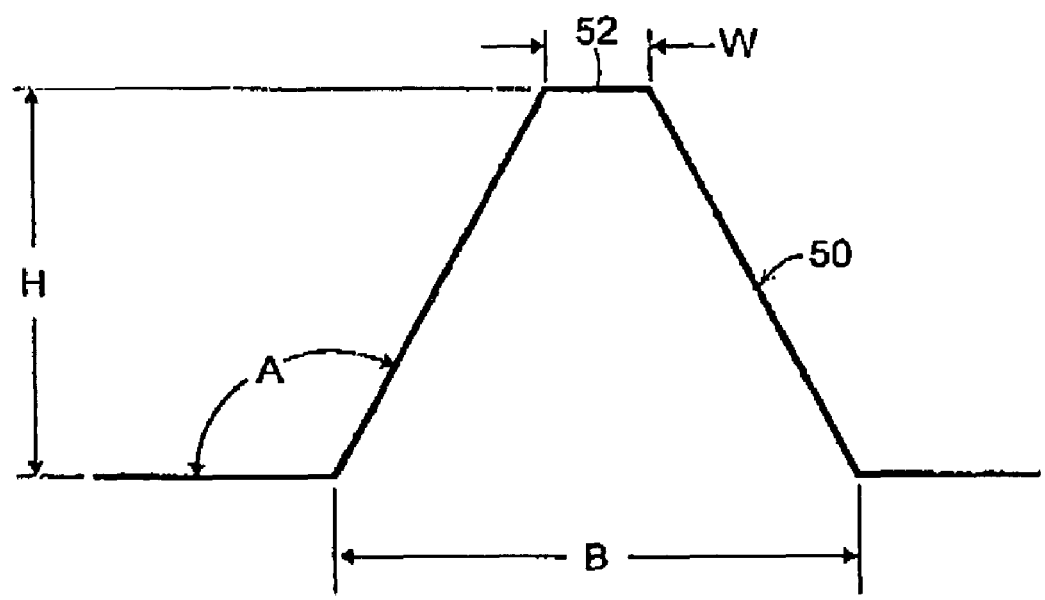
FIG. 11 is a schematic view of an example of a sealing ridge having a flat face useful in the present invention.
Figure 12:
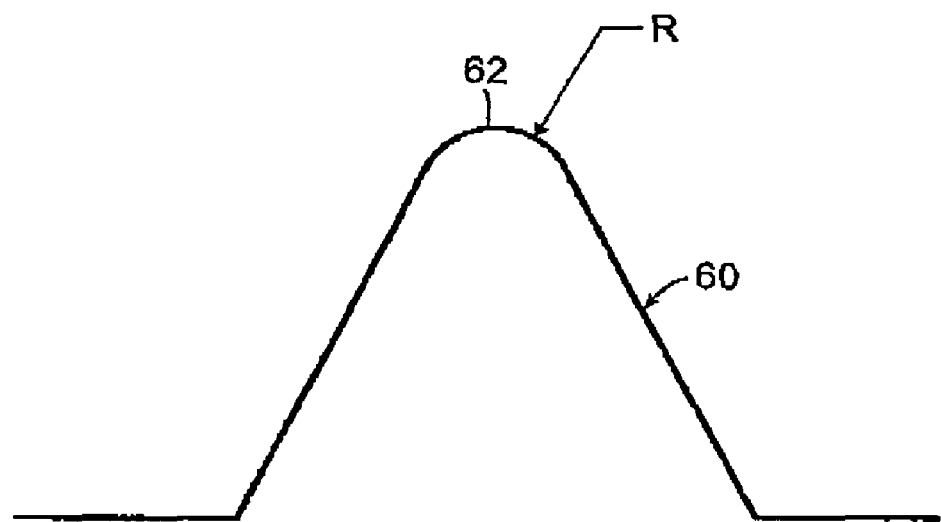
FIG. 12 is a schematic view of an example of a sealing ridge having a curved face useful in the present invention.

The ridges 40 and 42 can be provided in various shapes and sizes, and with different types of faces. As shown in FIG. 11, according to one example of a ridge, the ridge 50 is V-shaped and has a generally flat face 52. In FIG. 12, according to another example, a ridge 60 is U-shaped and has a curved face 62. Various shapes can be selected depending on particular applications, such as V-shaped peaks and valleys, U-shaped peaks and valleys, mixed U and V-shaped peaks and valleys, curved peaks and valleys, and non-uniform or different peak and valley shapes, such as flat shapes, arcs, and curves. The sealing face geometry can be chosen based on a particular application, and can include a conical shape, a flat face, or a curved face.

The spacing between ridges 40 and 42 can be determined in a manner to optimize localized stress concentrations, and to achieve a design that forms an optimal seal when collapsing at least one corrugation. For example, the ridges 42 can be uniformly spaced, as shown in FIG. 10, with a greater distance from the end ridge 40 to the first of the ridges 42, where such a configuration can apply a desired concentrated sealing pressure on a particular area of the folded end corrugation to better prevent unfolding and premature failure of the collapsed corrugation. In this way, at least one of the ridges 40 and 42 can serve as the primary sealing ridge. Alternatively, the ridges can be spaced apart in a different manner to concentrate primary sealing in another of the ridges 40 and 42.

The ridges can be made of the material used for the adapter 22, such as stainless steel, or can be made of other materials such as brass and various plastics. Sealing preferably is accomplished so as to prevent loss of gas and/or liquid from the tubing. The sealing device of the present invention can be used to connect tubing with a fitting, to connect two fittings, or to connect other types of components.

Referring again to FIGS. 9 and 10, peak stress concentrations are denoted by lines appearing closer together. For example, as expected, stress concentrations are greatest near the sealing faces of the ridges. The arrangement of the ridges can be varied, and an optimal spacing determined between each of the internal ridges 42, as well as an optimal spacing from the end ridge 40 to the first of the internal ridges 42. The term "end ridge" encompasses one or more ridges spaced apart from the internal ridges 42, and oriented to achieve an optimal sealing interface. As shown in FIGS. 9 and 10, deformation or localized yielding of the ridges can create annular sealing rings, which can provide a better sealing versus planar or conical interfaces.

As shown in FIGS. 11 and 12, the exemplary ridges 50 and 60 are marked with various dimensions. Such dimensions A, B, H, and W can be varied to suit a given application. Also, as described above, ridge spacing can be varied to produce optimal sealing conditions. By varying the width W of the sealing face, a flat or a sharp peak can be obtained. Referring to FIG. 12, the size of radius R can be varied, or the radius may be eliminated to be non-radial in shape.

The sealing device has been described with reference to different embodiments and examples of sealing ridges, in which the number and/or type of ridges is varied. It is within the scope of the present invention to provide a sealing device including ridges having characteristics of more than one of the disclosed embodiments, or configured in a manner that varies from the disclosed embodiments.

A method for sealing a length of tubing to a fitting according to the present invention can include steps of: providing a first sealing surface, providing a second sealing surface configured to engage the first sealing surface with at least one corrugation of the tubing received between the first and second sealing surfaces, forming a plurality of ridges on at least one of the first and second sealing surfaces, and collapsing the at least one corrugation between the first and second sealing surfaces such that the ridges contact the at least one corrugation to form a seal. According to this sealing method, the first sealing surface can be provided on an adapter of the fitting, and the second sealing surface can be formed on a bushing which engages the adapter.

The present invention also encompasses methods for transporting gas and liquid through piping or tubing, in which at least a length of tubing is sealed to a fitting as provided above. The methods can include transporting the gas and liquid to a device, such as a boiler, furnace, or stove.

The present invention further encompasses a method for installing a piping or tubing system in a structure, such as a commercial or residential building, where the installation method includes installing at least a length of tubing that is sealed to a fitting in the manner provided above. For example, the piping or tubing system can utilize CSST tubing and fittings.

Although preferred embodiments of the invention have been described using specific terms, such description is for illustrative purposes only, and it is to be understood that changes and variations may be made without departing from the spirit or scope of the following claims.

Incorporation by Reference

The entire contents of all patents, published patent applications and other references cited herein are hereby expressly incorporated herein in their entireties by reference.

What is claimed is:

1. A sealing device for connecting a length of tubing to a fitting, comprising:

the fitting having an adapter formed with a first sealing surface;

a bushing received in the adapter, the bushing being formed with a second sealing surface for engaging the first sealing surface with at least one corrugation of the tubing received between the first and second sealing surfaces; and a plurality of ridges formed on at least one of the first and second sealing surfaces, such that the ridges contact the at least one corrugation to form a seal, the plurality of ridges including an end ridge and at least first and second internal ridges arranged in order radially outward, said at least first and second internal ridges being spaced apart from the end ridge, wherein a distance between the end ridge and the first internal ridge is greater than a distance between the first internal ridge and a second internal ridge to provide concentrated sealing pressure and prevent unfolding of the at least one corrugation.

2. The sealing device of claim 1, wherein the internal ridges are U-shaped.

3. The sealing device of claim 1, wherein the internal ridges are V-shaped.

4. The sealing device of claim 1, wherein the internal ridges have a flat sealing face.

5. The sealing device of claim 1, wherein the internal ridges have a curved sealing face.

6. The sealing device of claim 1, wherein the internal ridges have a conical sealing face.

7. The sealing device of claim 1, wherein the plurality of ridges are annular raised ridges.

8. The sealing device of claim 1, wherein the at least one corrugation is an end corrugation of the tubing.

9. The sealing device of claim 1, wherein the first sealing surface is formed on a stop surface of the adapter.

10. The sealing device of claim 1, wherein the second sealing surface is formed on an end of an internal rib of the bushing.

11. A sealing device for connecting a length of tubing to a fitting, comprising:

a first component of the fitting formed with a first sealing surface;

a second component of the fitting formed with a second sealing surface for engaging the first sealing surface with at least one corrugation of the tubing received between the first and second sealing surfaces; and a plurality of ridges formed on at least one of the first and second sealing surfaces, such that the ridges contact the at least one corrugation to form a seal, the plurality of ridges including an end ridge and at least first and second internal ridges arranged in order radially outward, said at least first and second internal ridges being spaced apart from the end ridge, wherein a distance between the end ridge and the first internal ridge is greater than a distance between the first internal ridge and a second internal ridge to provide concentrated sealing pressure and prevent unfolding of the at least one corrugation.

12. The sealing device of claim 11, wherein the first component is an adapter of the fitting.

13. The sealing device of claim 11, wherein the second component is a bushing which engages the adapter.

14. The sealing device of claim 11, wherein the plurality of ridges are annular raised ridges.

15. The sealing device of claim 11, wherein the at least one corrugation is an end corrugation of the tubing.

16. A method for sealing a length of corrugated tubing to a fitting, comprising the steps of:

providing the length of corrugated tubing;

providing a first sealing surface;

providing a second sealing surface configured to engage the first sealing surface with at least one corrugation of the tubing received between the first and second sealing surfaces;

forming a plurality of ridges on at least one of the first and second sealing surfaces, the plurality of ridges including an end ridge and at least first and second internal ridges arranged in order radially outward, said at least first and second internal ridges being spaced apart from the end ridge, wherein a distance between the end ridge and the first internal ridge is greater than a distance between the first internal ridge and a second internal ridge to provide concentrated sealing pressure; and collapsing the at least one corrugation between the first and second sealing surfaces such that the ridges contact the at least one corrugation to form a seal, the at least one corrugation being prevented from unfolding by the plurality of ridges.

17. The sealing method of claim 16, wherein the first sealing surface is provided on an adapter of the fitting.

18. The sealing method of claim 16, wherein the second sealing surface is formed on a bushing which engages the adapter.

* * * * *